US012541773B1

United States Patent
Appiah et al.

(10) Patent No.: US 12,541,773 B1
(45) Date of Patent: Feb. 3, 2026

(54) SEGMENTED AUDIENCE BUILT FROM CONTEXT URLs

(71) Applicant: Oracle International Corporation, Redwood Shores, CA (US)

(72) Inventors: Frank Appiah, Broomfield, CO (US); John Orosa, Castle Park (GB); Monica Wedgwood, Bucarest (RO)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/792,028

(22) Filed: Aug. 1, 2024

(51) Int. Cl.
  G06Q 30/02 (2023.01)
  G06Q 30/0204 (2023.01)
  G06Q 30/0251 (2023.01)

(52) U.S. Cl.
  CPC ..... G06Q 30/0256 (2013.01); G06Q 30/0205 (2013.01)

(58) Field of Classification Search
  CPC .................. G06Q 30/0256; G06Q 30/0205
  See application file for complete search history.

(56) References Cited

U.S. PATENT DOCUMENTS

| | | | |
|---|---|---|---|
| 8,655,695 B1 | 2/2014 | Qu et al. | |
| 2009/0234784 A1* | 9/2009 | Buriano | G06F 16/337 707/999.005 |
| 2009/0281894 A1* | 11/2009 | Ratnaparkhi | G06Q 30/0246 707/999.005 |
| 2010/0161385 A1* | 6/2010 | Karypis | G06Q 10/04 709/224 |
| 2012/0209795 A1* | 8/2012 | Glickman | G06Q 30/0242 706/12 |
| 2015/0019324 A1* | 1/2015 | Schler | G06Q 30/0205 705/14.41 |
| 2016/0342699 A1* | 11/2016 | Shen | G06Q 30/0269 |
| 2020/0050707 A1* | 2/2020 | Tsykynovskyy | G06F 16/3347 |
| 2021/0241307 A1 | 8/2021 | Pavic et al. | |
| 2024/0176840 A1* | 5/2024 | Nagpal | G06F 16/958 |

OTHER PUBLICATIONS

"Predicting web site audience demographics using content and design cues" (Iljoo Kim, Gautam Pant; Information & Management; vol. 56, Issue 5; Jul. 2019; pp. 718-730; ISSN 0378-7206; https://doi.org/10.1016/j.im.2018.11.005—https://www.sciencedirect.com/science/article/pii/S0378720617303002) (Year: 2019).*

(Continued)

*Primary Examiner* — James M Detweiler
(74) *Attorney, Agent, or Firm* — Invoke

(57) ABSTRACT

Particular content is retrieved from a particular site, converted into vector embeddings, and categorized based on a similarity between the vector embeddings and aggregate vector embeddings of various categories. Consumer metric values are accessed for instances of content consumption by users and content for the sites accessed by those users as converted to vector embeddings. The consumer metric values and vector embeddings are used to train and validate a machine learning model. Content of a particular site is retrieved and converted into vector embeddings, and the machine learning model is used to generate predicted consumer metric values for the content, the content also having been categorized.

20 Claims, 7 Drawing Sheets

(56) References Cited

OTHER PUBLICATIONS

Adtelligence, "Acceleraid—AI-Based Customer Data Segmentation: An In-Depth Overview", https://acceleraid.ai/en/ki-basierte-kundendatensegmentierung-ein-detaillierter-ueberblick/, Nov. 17, 2023, 7 pages.
Dutton, S., "Digging into the Privacy Sandbox", https://web.dev/articles/digging-into-the-privacy-sandbox, Apr. 10, 2024, 13 pages.
Google.com, "Topics API overview", Privacy Sandbox, Google for Developers, retrieved online via https://developers.google.com/privacy-sandbox/relevance/topics, Apr. 10, 2024.
Google.com, "User demographic reporting", Privacy Sandbox, Google for Developers, retrieved online via: https://developers.google.com/privacy-sandbox/relevance/shared-storage/user-demographics, Apr. 10, 2024, 5 pages.
Kumar, D., Implementing Customer Segmentation Using Machine Learning (Beginners Guide), MLOps Blog, https://neptune.ai/blog/customer-segmentation-using-machine-learning, Dec. 19, 2023, 20 pages.
Mehta, J., "How to segment your customers based on demographics", https://abmatic.ai/blog/how-to-segment-customers-based-on-demographics, Nov. 18, 2023, 20 pages.
Onaudience.com, "Raw data from billions of devices for your data science team", Raw Data—On Audience, retrieved online via https://onaudience.com/raw-data, Apr. 10, 2024.
Onaudience.com, "Reach your audience globally with trusted data", Audience Data—OnAudience, retrieved online via https://onaudience.com/audience-data, Apr. 10, 2024.
Onaudience.com, "Reach your audience with cookieless solutions", Effective Strategies to Reach Audiences in a Cookieless World, retrieved online via https://onaudience.com/cookieless-solutionsutm_source=google_ads_&utm_medium=search_campaign&utm_campaign=google&gad_source=1&gclid=EAlalQobChMIw4eUybS3hQMVM6JmAh1TFQiFEAMYASAA-EgLht_D_BwE, Apr. 10, 2024.
Semasio, "Contextual Advertising Solutions", Fyllo, retrieved online via https://www.semasio.com/products/contextual-targeting, Apr. 10, 2024, 7 pages.
The Upwork Team, "How to Harness the Power of AI for Customer Segmentation", https://www.upwork.com/resources/ai-for-customer-segmentation, Oct. 24, 2023, 10 pages.
VentiveIQ, "Better Data at Every Stage", VentiveIQ—Connecting you to the World We Live In, retrieved online via https://ventiveiq.com, Apr. 10, 2024.
VentiveIQ, "Consumer Demographic, Empower Personalization, Segmentation, and Analytics with Consumer Demographic Data", retrieved online via https://ventiveiq.com/solution/demographics, Apr. 10, 2024.
VentiveIQ, "The Power of Audience Graphs: Leveraging Insights to Drive Business Success", retrieved online via https://ventiveiq.com/products/audience-graph, Apr. 10, 2024.

\* cited by examiner

US 12,541,773 B1

SEGMENTED AUDIENCE BUILT FROM CONTEXT URLs

CROSS REFERENCE OF RELATED APPLICATIONS

This application claims priority to Romanian Patent Application No. A 2024 00454, Inventors Frank Appiah, John Orosa, and Monica Wedgwood, filed on Aug. 1, 2024, titled "SEGMENTED AUDIENCE BUILT FROM CONTEXT URLS", which is incorporated by reference in its entirety for all purposes.

BACKGROUND

User requests to access a website require the collection of multiple sources of data that make up the display of the website for sending to the user's device before the website can be displayed. Some areas of the site can be designated as reserved as placeholders for secondary content that is not stored in the same location as the primary content of the website. A system handling the request can fill the locations for secondary content by obtaining a secondary content from a library of secondary content, however, the system that contains the primary content does not have the secondary content available and the system providing the secondary content does not have the primary content available to directly associate a secondary content with. Therefore, there is a potential for a mismatch of content between the primary content and the secondary content.

Fulfilling the user's request must also occur within a narrow time limit as the user has an expectation that the website will be loaded on their device quickly. Load times for a website can be increased by attempting to fill locations for secondary content when the secondary content that should be used is not known. Fulfilling the user's request within the narrow time limit is made more difficult when a system servicing secondary content does not receive information about the type of secondary content requested.

BRIEF SUMMARY

In some embodiments, a computer-implemented method includes retrieving particular content from a particular site, converting the particular content into vector embeddings, and categorizing the particular content based on a similarity between the vector embeddings and aggregate vector embeddings of various categories. Consumer metric values are accessed for instances of content consumption by users and content for the sites accessed by those users as converted to vector embeddings. The consumer metric values and vector embeddings are used to train and validate a machine learning model. Content of a particular site is retrieved and converted into vector embeddings, and the machine learning model is used to generate predicted consumer metric values for the content, the content also having been categorized.

In some embodiments, a computer-implemented method includes retrieving particular content from a particular site in an automated session with the particular site, generating one or more first vector embeddings of the particular content, categorizing the particular content in a first category based at least in part on a first similarity between the one or more first vector embeddings and one or more first aggregate vector embeddings of one or more first sites in the first category, and a second similarity between the one or more first vector embeddings and one or more second aggregate vector embeddings of one or more second sites in a second category; wherein a plurality of categories comprise the first category and the second category, and wherein a plurality of sites comprise the one or more first sites and the one or more second sites, accessing one or more first values of one or more consumer metrics for a first subset of instances of content consumption by content consumers opted in for consumer metric collection for one or more sites in one or more categories, and accessing one or more second values of the one or more consumer metrics for a second subset of instances of content consumption by content consumers opted in for consumer metric collection for one or more sites in the one or more categories, wherein the one or more consumer metrics about the first subset of instances of content consumption vary among at least two different content consumers even for a same site, wherein the one or more consumer metrics about the second subset of instances of content consumption vary among at least two different content consumers even for a same site, generating one or more second vector embeddings for first content from one or more sites of the plurality of sites consumed in the first subset of instances and one or more third vector embeddings for second content from one or more sites of the plurality of sites consumed from the second subset of instances, based at least in part on the one or more second vector embeddings and the one or more first values of the one or more consumer metrics for the first subset of instances of content consumption, training a machine learning model to predict one or more values of the one or more consumer metrics given a vector embedding of a site, validating the machine learning model against the one or more third vector embeddings and the one or more second values of the one or more consumer metrics for the second subset of instances of content consumption, applying the machine learning model as validated to predict one or more values of one or more consumer metrics for at least a third instance of content consumption for the particular content in the first category.

Retrieving the particular content from the particular site may be in response to a request to view the site by a user. In a further embodiment, a computer-implemented method may also include sending a third content to the user at least in part based on the first category and the one or more values of the one or more consumer metrics for at least the third instance of content consumption.

Accessing one or more first values and accessing one or more second values may occur before the retrieving the particular content.

Applying the machine learning model as validated may include inputting the first category and the one or more first vector embeddings of the particular content to the machine learning model.

Applying the machine learning model as validated may include, based at least in part on the first category, selecting the machine learning model from a plurality of available machine learning models, wherein each machine learning model of the plurality of available machine learning models is trained for one or more categories of the plurality of categories and inputting the one or more first vector embeddings of the particular content to the machine learning model.

In another embodiment, a computer-implemented method may also include applying the machine learning model as validated to predict a second one or more values of a second one or more consumer metrics for at least a fourth instance of content consumption for third content in a third category.

In another embodiment, a computer-implemented method may also include receiving one or more verified values of the one or more consumer metrics for at least the third instance of content consumption for the particular content, and verifying the predicted one or more values of the one or more consumer metrics for at least the third instance of content consumption for the particular content.

The one or more consumer metrics may comprise groupings of demographic information for multiple users.

The one or more third vector embeddings may comprise an aggregate vector embedding that is determined from a plurality of vector embeddings for the second content.

The particular content may comprise at least one image, and the first vector embedding may be determined based at least in part on characteristics detected based on similarities to one or more entries in a dictionary of patterns in the at least one image. The first content from the one or more sites of the plurality of sites consumed in the first subset of instances may comprise images, and the second vector embedding may be determined based at least in part on characteristics detected based on similarities to one or more entries in a dictionary of patterns in the images.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
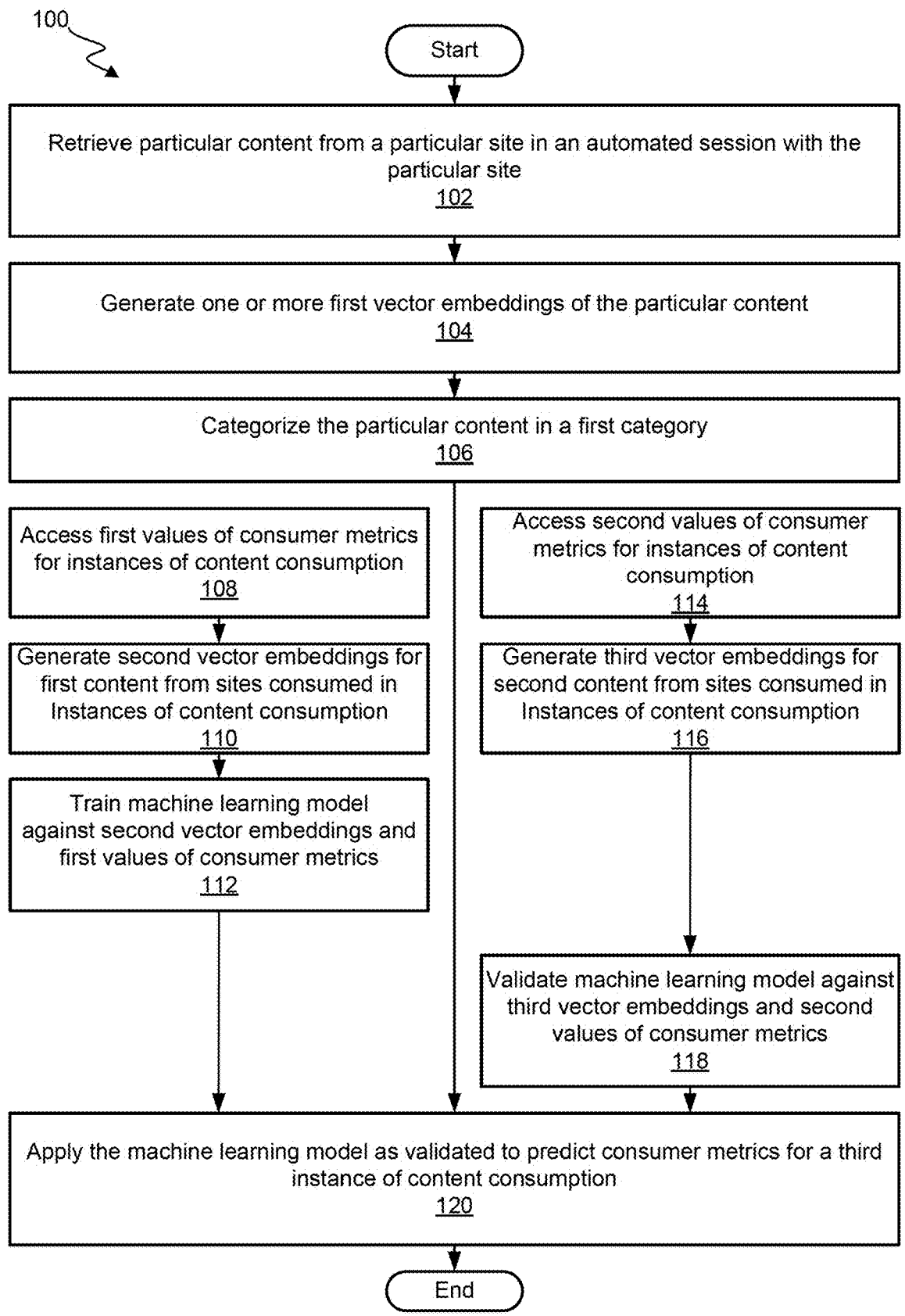
FIG. 1 illustrates an example set of operations for categorizing website content, generating consumer metrics of website content, and training machine learning models for the same.

A content management system is provided for categorizing website content, generating consumer metrics of website content, and training machine learning models for the same. In various embodiments, the content management system is implemented using non-transitory computer-readable storage media to store instructions which, when executed by one or more processors of a computer system, cause secondary content to be retrieved for display concurrently with primary content. The content management system may be implemented on a local or cloud-based computer system that includes processors and a display for showing the user interface to a user for content management. The computer system may communicate with client computer systems for content management.

A description of a content management system is provided in the following sections:
GENERAL OVERVIEW.
CATEGORIZATION BASED ON PERSONALITY
CATEGORIZE WEBSITE CONTENT WITH EXISTING DATA
INTELLIGENTLY RECOGNIZING CONSUMER METRICS
DETERMINING SECONDARY CONTENT BASED ON CATEGORY AND CONSUMER METRIC DATA
OTHER APPLICATIONS OF CONSUMER METRIC CATEGORIES
COMPUTER SYSTEM ARCHITECTURE The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

General Overview

Websites often contain spaces for display of secondary content, either by the site itself or by other organizations. When accessing a site, a user submits a request to view the site content that is passed through multiple servers that handle aspects of the request until finally the server containing the site content is reached, which sends the site content to the user or other necessary systems handling the request. A content management system handling the request to view the site content by the user may first access the site in a remote session to retrieve the target content and determine if there is availability to display secondary content. If there is availability to display secondary content, the content management system may retrieve the content of the site to analyze for determining what secondary content to display. The analysis of the site content may include the categorization of the content and the prediction or accessing of consumer metrics for users accessing the site.

In order for the secondary content to be displayed concurrently with the primary content, constraints of content delivery channels contribute to restrictions on how long the selection and delivery of the secondary content can take. Websites and other channels are optimally configured to deliver the primary content for which the web site was developed, whether the web site is a storefront or a news article. If the site takes longer than 1-3 seconds to load, as much as 50% or more of the users may be lost as unwilling to wait for the content, depending on the site. If the content takes more than 50 seconds to load, the average user has likely already finished consuming the content of the site and is ready to move on, depending on the site. For these reasons, in order for secondary content providers to agree to compensate primary content providers to place the secondary content on the site, the secondary content providers prefer reassurance that the secondary content was placed in front of a candidate consumer viewing the site for a minimum amount of time needed for the content to be considered consumed. Otherwise, the process of selecting secondary content, delivering the secondary content, and mixing the delivered secondary content with the primary content is wasted. Secondary content providers are unwilling to pay for secondary content placement that will not have time to be consumed.

Under such strict use case constraints, the content manager is tasked with matching the primary content with the closest or highest-compensating secondary content and providing the secondary content for consumption in real-time while the page loads, typically in milliseconds or in under a second. A script call from the web site, such as a JavaScript call, invokes an API offered by the content manager. The invocation of the API identifies the site and requests secondary content for inclusion on the site and/or a category for identifying secondary content. The content manager processes the API call to determine whether secondary content is already designated for the site. If not, the content manager matches secondary content with the site based on topics, consumer types, sentiments, brand safety, carbon emissions, disinformation content, and/or personalities associated with the primary content, but the content manager may not have the luxury of parsing the primary content in real-time before the content delivery window has expired. The content manager may inspect the cached information about the site to determine the closest available secondary content known for the primary content, and trigger an extended process of updating information about the primary content if the cached information is not precise enough or accurate enough in light of the traffic of secondary content being delivered via the site.

Applications, streaming services, and/or television media may include similar opportunities for secondary content placement, interleaving the secondary content with the primary content being delivered by the applications, streaming services, and/or television media to increase a likelihood that the secondary content will be consumed. Radio and podcasts may include audio placeholders for interleaving audio content with a primary content stream. The audio, video, or streaming content may be converted to text and parsed to determine categories or characteristics of the primary content for placing relevant secondary content into these placeholders. These scenarios with other media include similar time constraints as consumers interested in the content may change over time, and there are a limited amount of resources and limited time to devote to a single consumer of the resources at any given moment.

In some embodiments, a content manager of a content distribution service may deliver a best available item of secondary content in a first active user session while performing additional, more resource-intensive matching for future user sessions. The additional, more resource-intensive matching may include retrieving the content from the primary content provider for further analysis, and storing results of that further analysis in a profile of the site, a graph of sites, or any other data structure that logs characteristics detected on the sites. The data structure may include weights and/or probabilities that characteristics are associated with the sites, with closer associations between the site and certain characteristics represented by higher weights or higher probabilities of the connection.

FIG. 1 depicts an example set of operations 100 of an example embodiment. At block 102, particular content is retrieved from a particular site in an automated session. After the particular content is retrieved, at block 104, the particular content is used to generate one or more first vector embeddings. At block 106, the first vector embeddings are then used to categorize the particular content into a first category. At block 108, the system accesses first values of consumer metrics for instances of content consumption. The content of the instances of content consumption are, at block 110, then used to generate second vector embeddings. At block 112, the second vector embeddings are used with the first values of consumer metrics to train a machine learning model. Second values of consumer metrics are also accessed, at block 114, and the corresponding content is used to generate third vector embeddings at block 116. At block 118, the third vector embeddings and the second values of consumer metrics are used to validate the machine learning model. Finally, at block 120, the validated machine learning model is applied to predict consumer metrics for a third instance of content consumption, such as for content of the first category. The steps of each block may be performed in any order, however the validation step of block 118 is optimally performed after the training step of block 112.

Figure 2:
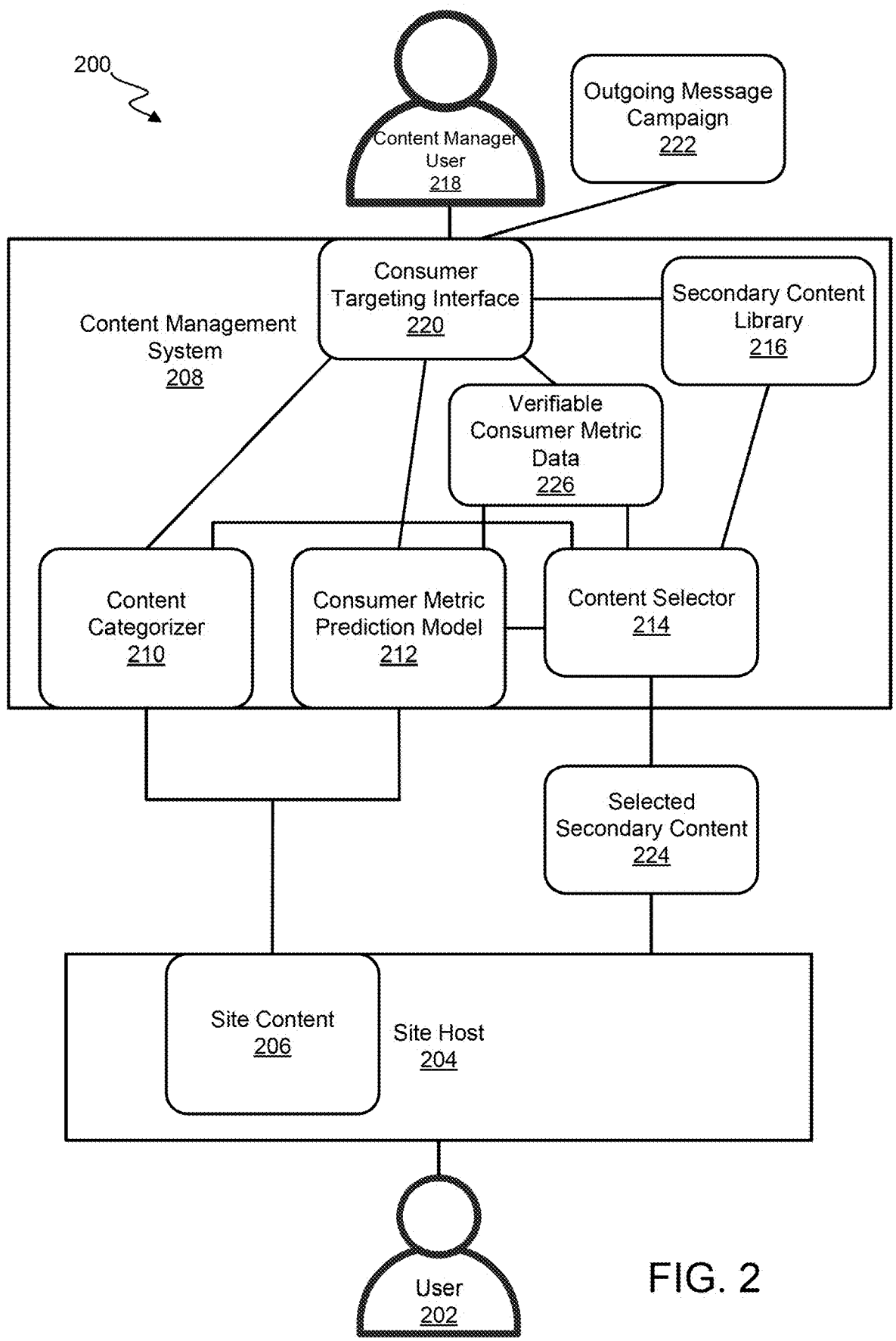
FIG. 2 illustrates a simplified distributed system for categorizing website content, generating consumer metrics of website content, and training machine learning models for the same.

FIG. 2 depicts a simplified distributed system 200 for implementing some embodiments. A user 202 sends a request to a site host 204 to access a site. The site comprises site content 206 which is stored by the site host 204. The site host passes the request to a content management system 208. The content management system 208 contains a content categorizer 210 and a consumer metric prediction model 212, which access the site content 206 via a remote session to categorize the site content 206 and predict consumer metrics for the user 202 based on the site content 206. The content management system 208 also contains a content selector 214 which receives the determined content category from the content categorizer 210, the predicted consumer metrics from the consumer metric prediction model 212, and communicates with a secondary content library 216 to select a secondary content to pass for display to the user 202 along with the site content 206. The secondary content library 216 contains a library of secondary content determined by a content management user 218 via a consumer targeting interface 220. The determination of conditions for selecting secondary content may also be determined by an outgoing message campaign 222 which sets automated conditions for display of secondary content via the consumer targeting interface 220. The content selector 214 selects a selected secondary content 224 from the secondary content library 216 that is passed to the site host 204 for display to the user 202. The consumer metric prediction model 212 and the content categorizer 210 generate their output according to past training or according to settings set via the consumer targeting interface 220. Data for training the consumer metric prediction model 212 may include verifiable consumer metric data 226, which may be inputted to the consumer targeting interface 220 by the content management user 218 or collected from a site host 204 from instances of requests of a user 202.

Figure 3:
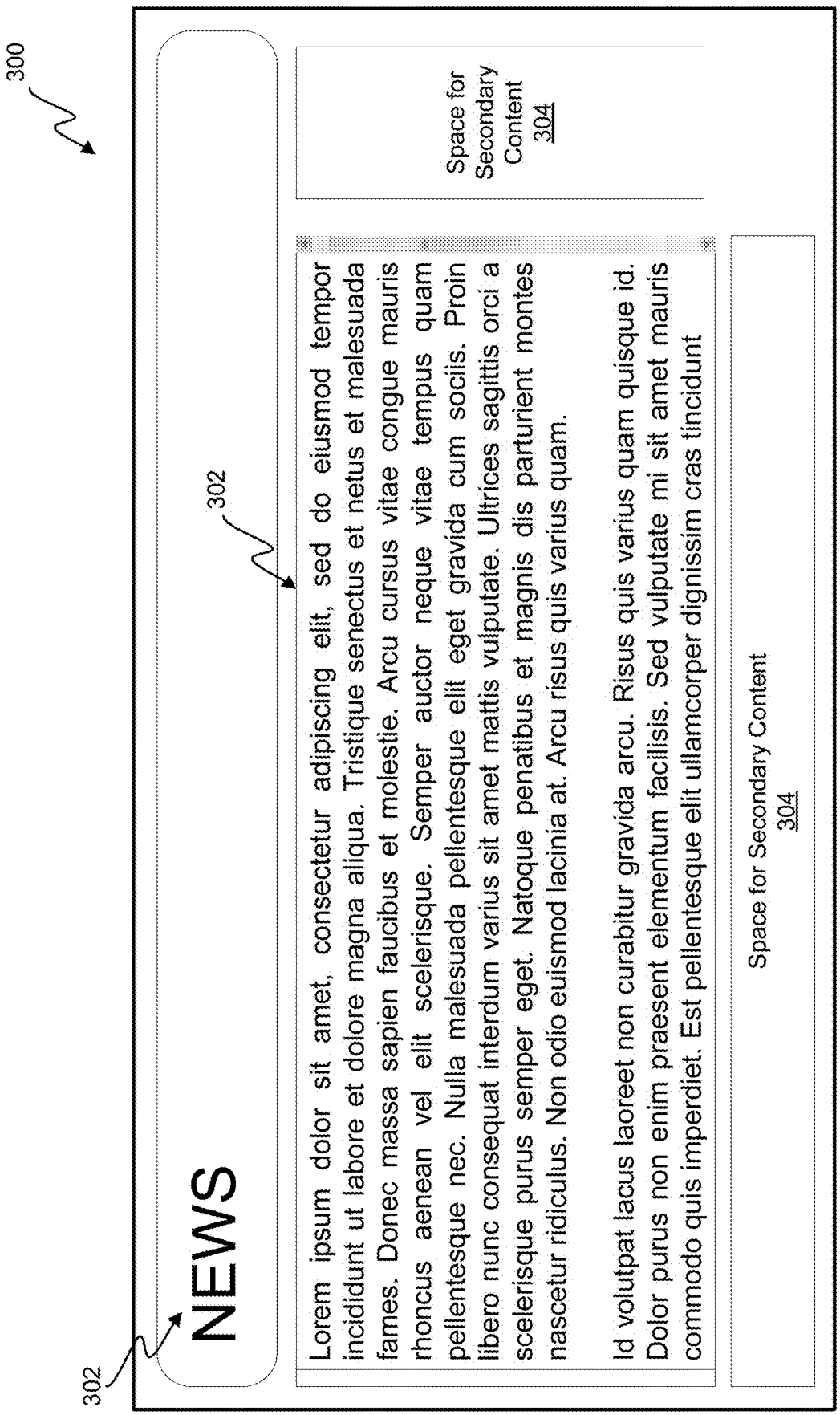
FIG. 3 illustrates an example site for displaying primary content concurrently with secondary content.

FIG. 3 depicts an example site 300 containing target content 302 and spaces for secondary content 304. Any combination of the target content 302 may be obtained by the content management system. The content management system may not require all of the data required to display the site 300, but may instead access data sufficient to determine the number of spaces for secondary content available and details of the spaces for secondary content, such as the size of the spaces. The content management system may also obtain only a limited amount of the target content data, such as only the text data.

In various embodiments, content is parsed to determine characteristics such as topics, consumer types, sentiments, brand safety, carbon emissions, disinformation content, and/or personalities associated with the content, for the example purpose of determining which consumers might be interested in the content or for the example purpose of learning more about consumers who have already shown an interest in the content. Example topics may differentiate "sports" versus "news" versus "wellness" or other topics, from an Interactive Advertising Bureau (IAB) taxonomy or graph, based on the content or a source of the content. Example consumer types include, but are not limited to, business consumers such as companies buying in bulk, conscientious consumers such as problem-solving individuals, discretionary spending consumers that spend extra money based on wants rather than needs, discount consumers that are in search of a deal, impulsive consumers that make impulsive buying decisions, loyal consumers that stick to the same brands, budgeted consumers that make long-term planned spending decisions, open consumers that look for innovative goods or services, and/or seasonal consumers that purchase certain goods or services at certain times of the year. Example sentiments include, but are not limited to, negative, neutral, or positive sentiments as mapped to different combinations or patterns of text. Examples of brand safety include, but are not limited to, content sources that are not subject to extreme negative sentiment or potentially illegal activities. Examples of carbon emissions include, but are not limited to, determinations that are made based on the web hosting service, shipping services, and/or goods or services offered based on content. For example, the carbon footprint of shipping large new appliances is greater than the carbon footprint of shipping parts for appliances. Examples of disinformation content includes information that has been determined, via a fact-checking service, to be false, and may pose a risk for any secondary content that is placed in association with the disinformation content. Example personalities include, but are not limited to, the Big 5 personality traits (neuroticism, extraversion, openness to experience, agreeableness, and conscientiousness) or any other personality characteristics that describe how a consumer thinks about or approaches a variety of topics. Any combination of one, two, or more of these characteristics may be included in a graph that aligns web site content with expected consumer behavior and/or otherwise describes or predicts consumer behavior, for example, as relating to a website or other communication.

There are many different candidate personalities or persona schemas, and different personalities and persona schemas are associated with different consumer behaviors. Aligning content with consumer personalities increases the engagement with the content by consumers as a measurable improvement in content delivery. Categories of different personalities are also called personality segments. More generally, categories of different candidate audiences are called audience segments. Secondary content may be placed on sites aligned with specific audience segments such that the audience segments of the sites align with the audience segments predicted to have maximum engagement with the secondary content being placed on the sites.

Categorization Based on Personality

Various aspects of personality-driven content and consumer categorization are described in U.S. application Ser. No. 18/659,236, filed May 9, 2024 and titled "GRAPH-BASED CONTEXTUAL TARGETING OF CONTENT CONSUMERS," the entire contents of which is incorporated by reference herein for all purposes.

Scientific research has shown that personality segments indicate consumer propensity for impulsive buying, compulsive buying, hedonic consumption, and/or utilitarian shopping. Impulsive buying is the sudden urge to make a purchase. Compulsive buying occurs when a consumer makes purchases for the sake of making purchases, based on a feeling that consumption must occur. Hedonic consumption is based on the emotional and psychological value such as excitement or joy that comes from shopping. Utilitarian shopping is purpose-driven shopping to solve a problem.

These general consumer behaviors are linked to different personalities with varying degrees. Personality traits such as the Big 5 personality traits (neuroticism, extraversion, openness to experience, agreeableness, and conscientiousness), for example, have been shown to predict compulsive buying, impulsive buying, hedonic values, and/or utilitarian values to different degrees with different consumers. Additional personality traits are useful when analyzing branded content targeted towards consumers, such as sincerity, competence, excitement, sophistication, and ruggedness. Other personalities may be applied and defined for specific brands or in specific contexts where brand owners have found use in distinguishing their brand's personality from other brands' personalities. When combined with emotions such as positive or negative feelings towards a topic, to varying degrees, personalities can be even more predictive of consumer behavior. Brand loyalty or loyalty to ideals (e.g., carbon efficiency) and other factors may also increase the predictability of consumer behavior. A consistent appeal to personality may strengthen a brand's personality and strengthen the effectiveness of content delivered to candidate consumers of the content, promoting engagement with the content and/or downstream activities such as the purchases of goods or services featured in the content.

In various embodiments, contextual personality and sentiment segments may be combined with characteristics of groups of candidate consumers to determine consumer types, affinities of the groups with various types of content, at various levels of engagement or conversion with various content, products, and/or services, and affinities of the groups with brands and brand personalities. These insights offer distributors of secondary content the ability to target candidate consumers with relevant content, products, and/or services.

Candidate consumers may be grouped based on one or more attribute values or ranges, and these attribute values or ranges may serve to define the group. A consumer type may be determined by deriving personality and sentiment from content that is consumed and associating the personality and sentiment from the content back to the consumer of the content. Personality and sentiment may also be determined for content that is consumed by associating personality and sentiment from the consumer types of consumers of the content to the content's personality and sentiment.

Groups of candidate consumers may have an affinity with certain content types or brands based on personality types of the groups. Brands may be defined not just by their products but also by the content associated with the brands. Using personality types to segment groups of candidate consumers helps identify consumers with similar needs, wants, and product responses using psychographics. Using personality types for content delivery, candidate consumer segmentation, and candidate consumer outreach influences behavior of the candidate consumers. For example, extraversion and conscientiousness are significant predictors of loyalty of candidate consumers to brands, and together with the emotions of joy, gratefulness, and stress, these personality types may predict, in the example, about 10% of the variance in loyalty of the candidate consumer.

Contextual personality segments may be used to identify target content, to identify target consumer types, to infer consumer types from content consumption, to infer consumer types from downstream activity such as purchasing behaviors, and/or to predict content consumption and/or downstream activity such as purchases. Determined personalities may have an attraction or affinity with certain content, may inform the consumer type and/or otherwise be positively or negatively associated with certain sentiments, topics, or consumer types.

In various embodiments, a content manager provides a user interface to select contextual personality segments for identifying target content for placement of secondary content and/or target candidate consumers for outreach, such that the targets are associated with the contextual personality segments. Example selectable contextual personality segments include, but are not limited to, adventurousness, altruism, ambition, anxiety, assertiveness, boldness, carefree, cautiousness, challenging, cheerfulness, contentment, contrary, cooperative, creative, detached, disorganized, dutifulness, emotional intelligence, empathetic, energetic, excitement-seeking, extrovert, friendliness, gregariousness, etc. Combinations of contextual personality segments and/or other segments may be selected to identify relevant content with an affinity for the contextual personality segment, and/or to target candidate consumers who overlap with a contextual personality segment. Combinations may be determined based on an intersection between datasets (whether content sources associated with the segments or candidate consumers associated with the segments) identified by each of the separate characteristics being combined.

The interface provided by the content manager may provide an option for a secondary content provider to select a content site or group of content sites for regularly placing secondary content. The content manager may receive a query that searches for content associated with adventurous eaters and conservative dressers. The content manager may break the query up into two parts: (1) adventurous eaters content and (2) conservative dressers content. The content manager may then search for pages that match food or eating topics and adventurous personality to determine a first set of pages, and the content manager may search for pages that match clothing or dress topic and conservative personality type to determine a second set of pages. The content manager may then determine a content source intersection between the first set of pages and the second set of pages to find pages that have included content that is directed to both adventurous eaters and conservative dressers. In one embodiment, the content source intersection is a parent site that offers a variety of content at various times, such as dated articles or blogs. In another embodiment, the content source intersection is an item of content such as a specific article, landing page, or company site that offers content in the specific combination of categories.

In a further embodiment, sentiment may be added to the query to include content sources having positive sentiment, for example. The combination of content sources may be further reduced to include only those pages that exhibit positive sentiment.

In another embodiment, a content manager provides an interface to select a variety of combinations of characteristics, and an audience may be determined not by the people who have all of the characteristics but based on candidate consumers who have visited pages that, collectively, exhibit all of the characteristics. For example, the content manager may receive a query that searches for adventurous eaters and conservative dressers. The content manager may break the query up into two parts: (1) adventurous eaters and (2) conservative dressers. The content manager may then search for a first set of pages that match food or eating topics and adventurous personality to determine a first group of candidate consumers that visited pages from the first set, and the content manager may search for a second set of pages that match clothing or dress topic and conservative personality type to determine a second group of candidate consumers that visited pages from the second set. The content manager may then determine an audience intersection between candidate consumers that viewed the first set of pages and candidate consumers that viewed the second set of pages to find an audience of candidate consumers who are both adventurous eaters and conservative dressers.

Contextual personality segments may be mapped to consumer types, context sentiment, context topical categories, and potentially combined with audience attributes to derive (a) consumer types with affinities, (b) affinities to content, products, and/or services, (c) affinities to brands and, in turn, brand personalities. The contextual personality segments may be used to align content delivered in association with certain brands to target compatible candidate consumers.

In one example, a segment Adventurousness uses contextual terms around extreme sports, adventure travel, physical challenges, etc. The segment is associated with a known consumer type, and a graph is generated to associate the consumer type with URLs or content based on these contextual terms. Candidate consumers may also be associated with the consumer type based on consumption of the content using these contextual terms.

Categorize Website Content with Existing Data

Whether categorizing content based on personality, sentiment, topic, or any other characteristic common to the content, the content may be compared with other content already marked with categories to determine which groups of categorized content are closest. To determine the category of content, the content management system may call a content categorizer to analyze the content of a site and determine a content category. The content categorizer may match the content against vector embeddings generated from different sets of sites. For example, the content categorizer may make a first determination of whether the content has keywords of a first set of keywords associated with a first contextual personality label for a set of sites and a second determination of whether the content has keywords of a second set of keywords associated with a second contextual personality label associated with a second set of sites. As a result of the first and second determinations, the site label for the content may include a contextual personality label associated with the first set or the second set of sites and exclude a contextual personality label associated with another of the first or second set of sites. For example, the cosine distance between the term embedding vector of the content may be closer to a term embedding vector of one set of sites or the other, and the contextual personality label associated with the closer set of sites may be selected for the label.

In one embodiment, seed example content is built for each category of a plurality of categories, and a content categorizer uses vector embeddings constructed from the seed content to classify new content. The seed content vector embeddings may comprise an aggregate vector embedding of the vector embeddings of all the seed content. The seed example content is used to discover candidate consumers associated with the category, and the candidate consumers and/or the example content may be used to discover other example content and/or candidate consumers associated with the category.

A list of seed terms may be developed that relate to individual categories based on synonyms and other words that are frequently used to describe the personality type in the psychological context of that category. Another list of seed terms may be developed as examples of content that a person having that personality type may consume. For example, adventurousness personality type may include keyword examples of rafting, rock climbing, etc., and an openness personality type may include keyword examples of design, creativity, and inspiration.

Personalities and/or emotions may be determined prevalent for a source based on content conveyed by the source. For example, some sources may convey information that appeals to conscientious personality types, as compared to lax or disorganized personality types. Sources that may appeal to conscientious personality types include sources that appeal to science, reason, or deliberation, as compared to a quick laugh, a random story, or an unsupported opinion. As another example, sources may convey information that appeals to extraversion personality types, as compared to those with introverted or isolated personality types. Sources that may appeal to extraversion may include sources that appeal to social opportunities, peer reviews, activities, and experiences, as compared to isolated projects and fact-intensive compilations.

The pages may be detected for different categories based on a rarity of keywords, phrases, or content associated with those categories among all pages and a frequency of the words in the individual pages. In a particular embodiment, each page is scored for each term based on term frequency (e.g., occurrences of words in the document) multiplied by the inverse of the document frequency (e.g., the rarity of words among the documents).

Once pages have been categorized into different categories, additional terms, such as trending terms or other updated terms, may be discovered for the categories based on how frequently the terms appear across the pages in the category and/or how infrequently the terms appear across the pages in other categories. Categories may have hundreds or thousands of mapped terms as a result of seed terms, seed pages, and discovery of additional terms. These terms, if present in a page, serve as indicators, with some terms being stronger indicators than others (i.e., more unique to the particular category), that the page is in the particular category.

In one embodiment, Word2Vec is used to detect word embeddings of the pages in the different categories, such that each category may be associated with different representative vectors of words and their associated meanings that are common for the category. Other pages may be discovered using Word2Vec on existing pages labeled with a category to discover new pages that have not yet been labeled with a category, and new words may be discovered using Word2Vec on the new corpus of pages associated with the category after adding pages, in an iterative manner.

A content categorizer may receive millions or even billions of new pages daily that are reported as being visited by consumers, many of which may have not yet been categorized. A Word2Vec vector of the content of the new pages may be constructed to represent the occurrence and meaning of words in the new pages. In order to construct the vector, the content of the new page may be retrieved in a separate session between the content manager and the site, as the original content consumption was detected between a consumer and the site. The content categorizer may know the site URL and the identity of the site but likely does not have the full contents of the site based on the initial report of which consumers viewed the site. The separate retrieval of the content of the site by the content categorizer allows the content categorizer to view the site as if the content categorizer were a consumer, to process content that the consumer would have seen when visiting the site.

In one embodiment, the separate retrieval of the content of the site by the content manager occurs in parallel with a consumer session with the site. Once the content categorizer detects that a consumer is viewing a site that has not yet been categorized, the content categorizer may load the site and ingest text from the site for the purpose of categorizing the site among a plurality of categories, such as a personality type for the site, based on a Word2Vec vector representation of the category and a Word2Vec vector representation of the site. The content categorizer may experience an error in loading the site, such as a 404 (site not found) error, a 504 (gateway timeout) error, or any other error that a client may experience when loading a site. The content categorizer may need to retry or queue the site for retries of loading the site's contents to determine a category for the site. To protect the content categorizer, the site may be blocked from autoloading the site, via a blacklist of sites, if the site contains malware or content that is otherwise designed to interfere with the functioning of the content manager. The site may be ingested as the consumer is also viewing the site, such that the content categorizer can learn of which category the site most closely represents in real-time, e.g., in milliseconds or in under a second, to serve up content associated with the corresponding category.

This process of ingesting a new site into a vector may include removing, from the site, any content that would not be rendered in the user interface of a consumer, such as meta tags on the site aimed at achieving higher traffic, scripts, HTML tags and tag identifiers, function names, comments, window, frame, or section names, etc. After the process, raw text displayed on the website, for example, as rendered in a browser, may remain for analysis, and non-rendered components may be excluded.

A content categorizer may search the existing data available for personalities, topics, and/or other categories to determine which personalities, topics, sentiment, consumer type, and/or other categories best match the new site. In one embodiment, the content categorizer may match the new pages to a representative Word2Vec vector of a personality type, among a plurality of vectors representative of a plurality of personality types, based on a distance between the new page's vector and the representative vectors. The new page may be added to a category that has a representative vector embedding that best matches the vector embedding of the new page. In one embodiment, a new page may be matched to a plurality of categories if the new page's vector embedding is close enough to representative vector embeddings of the plurality of categories.

In a particular embodiment, the closeness of the new page's vector embeddings to the representative vector embeddings of personality categories may be measured using cosine similarity, which measures the cosine of the angle between the two vector embeddings, which is equal to the dot product of the vectors divided by the product of the vectors' lengths.

In another embodiment, Word2Vec is used to detect word embeddings of pages consumed by consumers that have also positively engaged with a brand (e.g., through purchases, subscription, creation of a user account, etc.). The word embeddings of the pages consumed by consumers who have also positively engaged with the brand may be used to classify the types of pages that are most frequently interacted with by consumers such as customers of the brand. The vectorized embeddings of the brand's pages may be compared with the vectorized embeddings of the personality pages to determine a brand personality or personalities for the brand that best match the brand's consumer page visits. In a further embodiment, the brand personality determined may be used to discover candidate consumers and candidate content sources that are not yet known to be associated with the brand.

In one embodiment, embeddings of pages based on images, videos, and/or audio content in addition to textual content may be categorized. The images, video, and/or audio content on the pages, whether already categorized or not with some categories, may be parsed and passed into a machine learning model for identifying text embeddings based on images, video, and/or audio content inputs into the machine learning model. The machine learning model may, for example, be a speech-to-text model for identifying textual content based on audio content, may be an image recognition model for identifying content from images, may be an image recognition model that operates on video content that includes a sequence of images, and/or may be a video content model that operates on audio transcriptions from the video. The machine learning model may also match an image or video data to a most similar dictionary entry of known patterns. The most similar dictionary entries are marked or given high weights in the vector embeddings while non-similar dictionary entries are either not marked or given low weight in the vector imbeddings. An output of the machine learning model may include additional embeddings of content on the site, and, if the page has been categorized in a category, those embeddings may form a part of the average or aggregate vector embedding for sites having the same category. If the page has not yet been categorized, the output may be used for matching against aggregate vector representations of pages that have already been categorized in different categories.

In an example, the content categorizer automatically generates a textual description of image data in the content to be classified. The textual description may be combined with other text parsed or otherwise determined for the content, and the combined textual description may be used to generate a vector embedding of the content. The content categorizer may then compare the vector embedding of the content with vector embeddings of different contextual personalities to determine a labeled contextual personality for the content at the exclusion of other labels of contextual personalities.

In one embodiment, text-based categorization occurs during a step of generating mappings between example sources of content and categories. Once the text-based categorization occurs, different sets or groupings of consumers are determined that frequently view content having certain personalities. Then, the different sets or groupings of consumers may be used to refine the mappings between examples sources of content and personality types and/or to reach out to the different sets or groupings of consumers with information or content associated with the associated personality.

In one embodiment, the content categorizer may determine a numerical confidence of the match between the content and a determined category. The content categorizer may be validated by submitting tagged URLs, such as URLs where the determined category has a low confidence score, to human reviewers to confirm whether the category assigned by the content categorizer is correct.

In one embodiment, a data management system makes use of Term Frequency Inverse Document Frequency (TFIDF) techniques to provide more weight to words that are uniquely frequent in a given set of documents or sites and infrequent in other documents or sites, and small weight otherwise based on the text tokenized from the crawled contents.

A machine learning model may also be trained based on target website content or vector embeddings generated based on the target website content and the categories determined by the algorithmic categorizer. The target website content or vector embeddings of the target website content may be stored along with the associated categories determined by the algorithmic categorizer, to generate a training data set for a machine learning model. This training data set may then be used as labeled data, and optionally divided into training and validation data, in training a machine learning model for predicting the categories associated with target content based on the vector embeddings of the target content that the algorithmic categorizer would assign to that same target content.

Intelligently Recognizing Consumer Metrics

Consumer metrics of users for a given site are useful for determining secondary content to display with the contents of that site. Consumer metrics may comprise demographic information such as age, gender, ethnicity, nationality, location, or income level. Consumer metrics may also comprise information about the user's habits such as a likelihood of consumption of secondary content on a site or likelihood of making a purchase on a site. Consumer metrics may also represent groups of users, such as an age range or geographical region containing multiple sub-regions. Such demographic information groupings may group together users based on a similarity between demographics, such as users of a consecutive age range. Such demographic information groupings may also group together users of disparate demographics based on a common response to certain content or sites, such as users from many foreign countries for tourism content.

Any given site has verifiably associated metrics that represent the real consumer metrics of all the users of that site. Verifiably associated consumer metrics are recorded via cookie data for individual instances of engagement with a site or via recording disclosed data about a user who has opted-in for consumer metric collection whenever that user engages with the site. Verifiably associated consumer metrics may relate to engagements with a site from multiple users and multiple different engagements with a site from the same user.

There may be instances of a user viewing a site where no or little verifiably associated metrics are available, such as if cookie data for a user's engagement is unavailable and the user has not opted-in for consumer metric collection. In such a situation, to aid in selecting secondary content to display with the site consumer metrics for the user may be predicted based on the content and past consumer metric data for the site.

A machine learning model may be trained to predict consumer metrics from the target website content. The target website content or generated vector embeddings of the target website content and data derived from a subset of instances of content consumption may be stored and used as labeled data for training a machine learning model. The target website content may be text data, image data, video data, audio data, or meta data associated with the site. Data derived from a subset of instances of content consumption may comprise website cookie data that represents the usage of a website by users. Data derived from a subset of instances of content consumption may also comprise data collected from users who have opted-in for consumer metric collection in their usage of websites. The data derived from a subset of instances of content consumption may comprise the users' age, gender, ethnicity, nationality, or other demographic information. The data derived from a subset of instances of content consumption may be combined with the content of the websites or generated vector embeddings for the content of the websites visited by the user in the instance of content consumption. This data may then be used as labeled data for training a machine learning model for predicting the various demographic information included in the data derived from a subset of instances of content consumption.

In an example embodiment, verifiable consumer metric data may be available for a set of URLs as cookie data from past instances of user engagement with those URLs. For each instance of user engagement with a URL, the relevant cookie data, which records the age of the user, is paired with the vector embeddings of the content of the site accessed via the URL. The combined vector embeddings and age cookie data may then be used as labeled data for training a machine learning model to predict the age of users of a site.

Validation of the machine learning model may also be performed by a comparison between the statistical outputs of the consumer metrics. Data may be available showing statistics of a collective audience of a set of URLs. By passing the content or vector embeddings of the content of those URLs to the machine learning model, a set of data of predicted consumer metrics may be generated which may be analyzed to determine a predicted consumer metric statistic. The predicted consumer metric statistic may be compared with the available collective audience statistic to validate the output of the machine learning model.

In an example embodiment, an existing audience consumer metric statistic of a set of URLs may identify that 80% of users of that set of URLs are female and 20% of users of that set of URLs are male. The vector embeddings of the content of the set of URLs may then be passed to the machine learning model, which will create a prediction for each URL of the set of URLs as to the gender consumer metric. This predicted gender consumer metric may be a predicted ratio of gender of users of any given URL or a most likely gender of users of a given URL. The set of predicted gender consumer metrics output by the machine learning model may be analyzed to determine an overall predicted consumer metric ratio of the set of URLs. This predicted consumer metric ratio may be compared to the existing audience consumer metric statistic of 80% female and 20% male to determine a distance or variance by which the machine learning model's predictions differ from the expected output to validate the machine learning model.

In one embodiment, validation may also occur after a production machine learning model has been used to predict consumer metrics as the consumer behavior was measured without knowing which consumers clicked on or otherwise engaged with content. The consumer behavior may be determined based on purchase behavior or loyalty account logins that occurred as a result of the content. The content may include a unique tracking identifier that remains in the consumer's session to a point where the consumer logs in to make a purchase, enters their shipping address, accepts cookies or logged history data in the session, or otherwise identifies herself or himself to obtain a benefit offered by the service, such as one offered by the content provider. At that point, the unique identifier may be used to determine which content was served to the consumer, and there may already be predicted consumer metric data for that first interaction with the site as created by the production model. An identity of the consumer, such as an email address, IP address, user ID, loyalty ID, or account ID, or other information uniquely identifying the consumer may be used to match the content delivery and consumer activity to a profile in an identity graph that stores consumer activity, consumer profiles, and probabilistic relationships between consumer profiles and activity that has not yet been uniquely mapped to an individual consumer. The predicted consumer metric data may then be compared to the newly obtained verifiable consumer metric data to determine a variance. This variance and the consumer metric data may be used to further validate the production model.

In some embodiments, after the machine learning model is trained and validated, the model may be used to predict consumer metric data for future site content in conjunction with a content categorizer.

The machine learning model may be trained with labeled data including content vector embeddings, verifiable consumer metric data, and the categories for the content as determined by the content categorizer. In this way, the machine learning model takes into account the category of the content as determined by the content categorizer. For this embodiment, the content categorizer categorizes the content before the machine learning model is used, so that the category is available as data to use as an input to the machine learning model. The categorizing step may be performed any length of time in advance of using the machine learning model, so long as the determined category is recorded for the content in question. As an example embodiment, a website may be accessed by a user that contains content focused on the sport of Pickleball. The content categorizer may then be used to categorize the content as within the category of outdoor sporting equipment retail. The machine learning model is then used and is given as an input the generated vector embeddings of the website content and the determined category of outdoor sporting equipment retail. In predicting consumer metrics for the website, the machine learning model may produce a different result when having the category, such as a lower expected user age, than if it had only been given the vector embeddings of the Pickleball content of the website.

In an alternative embodiment, the machine learning model may be one of many machine learning models, each trained only using data including content of sites of a given category as determined by the content categorizer. In this embodiment, the site content is categorized by the content categorizer, then a machine learning model is selected based on the determined category. The machine learning models may be trained on content from a limited number of categories, such as to group related categories. This embodiment requires that the determined category has a predefined, corresponding machine learning model for predicting consumer metrics for that category. There may be a default machine learning model that is trained on data from multiple categories that may be used in the case that a category cannot be determined for a given content. This embodiment may produce machine learning models that can predict consumer metric data with increased granularity for their given category of content. This embodiment may also create a risk of a machine learning model being incorrectly selected and giving an unpredictable or incorrect result in attempting to predict consumer metrics for content of a category it has not been trained on.

In yet another alternative embodiment, the machine learning model may be a single model, trained on labeled data including verifiable consumer metric data and content vector embeddings for content of many or all categories of content. In this embodiment, the steps of categorizing the content and predicting consumer metrics are independent and can be performed in any chronological order or with any length of time separating the two steps. This embodiment may produce a machine learning model that is able to make more accurately predict consumer metrics for content of any category when compared to machine learning models trained on more limited data. This embodiment may also produce a machine learning model that is able to more accurately predict consumer metrics for content that is of multiple or an unknown or undefined category.

Determining Secondary Content Based on Category and Consumer Metric Data

When a user sends a request to access a site, the site will contain a first content, however the site may also contain locations for inserting a second content. In order to optimize the targeting of the second content's alignment with the interests of the user, information about the user's preferences should be determined. As the user's request to access the site is received, the system may remotely access the site to extract the first content from the site. The first content may then be used in both a categorizer and a predicted consumer metric generator to determine a category of content and predicted consumer metrics. The content categorizer may comprise an algorithmic categorizer or the categorizer may comprise a machine learning model trained to output categories from an input of content vector embeddings. The predicted consumer metric generator may comprise a pre-trained machine learning model, trained to output predicted consumer metrics from content vector embeddings.

After a category and predicted consumer metrics data have been determined for a the site requested by the user, a library of secondary content may be searched based on a logical condition between the category and at least a part of the predicted consumer metric data. After a second content has been identified as a preferred secondary content for the user, the first content may be sent to the user along with the second content for inserting in the first content when displaying the site to the user.

In one embodiment, the predicted consumer metrics and/or the web site content may be mapped to a personality segment, audience segment, or other categorization of the content and/or a consumer of the content. The audience segment may represent a variety of users or consumers, but who are similar along certain aspects that are relevant for determining a secondary content to display to users of that audience segment. The audience segment may be further abstracted to classes of users collected as candidate audiences with unique identifiers relating to the correlation with one or more groupings of secondary content. In one embodiment, the audience segments or collections of candidate audiences are archetypal and do not have a one-to-one relationship with individual behaviors. The approach therefore maintains the anonymity and privacy of users.

Figure 4:
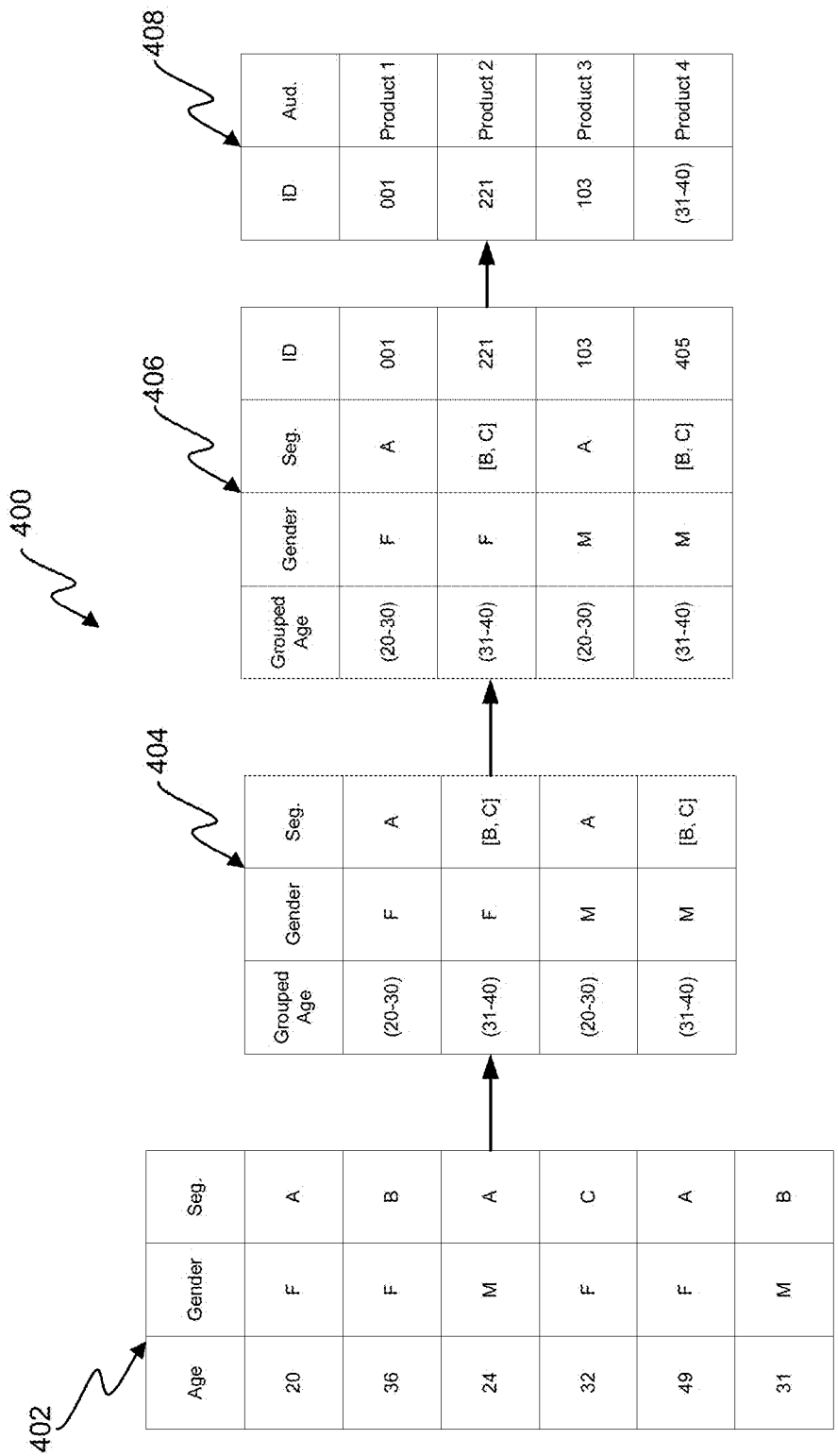
FIG. 4 illustrates a process of consumer metric data analysis.

FIG. 4 depicts an example mapping of demographic information into audience segments and groupings of candidate audiences. The first table 402 depicts the age, gender, and personality segment of multiple users. The individual users are grouped to larger audience segments based on groupings of ages in the second table 404. In the third table 406, grouping of candidate audiences are assigned to the larger audience segments to identify a candidate audience for a given product as shown in the fourth table 408. The candidate audiences for a given product or secondary content may then be shelved, or stored in a table available for future access when determining a secondary content for an audience of a future analyzed site.

Keywords and content from example sources in specific categories may be used to build a graph that indicates how likely different sources are to cause engagement for different personality types or other categories of consumers. The graph may be specific to individual sources or generic with respect to a representative vector of content from the group of sources to which an individual source is mapped.

In one embodiment, an identity graph may be updated for thousands or millions of users that consumed content in a session and later identified themselves in the same session, to indicate a probability of each different category of user consuming each different type of content. The identity graph may then show which sites were visited by which individuals, the categories of the sites and categories of the individuals, which terms are most prevalent and unique to the sites visited, and which personalities and/or topics are embodied by those terms. The list of terms may be expanded based on personalities and/or topics discovered to be associated with a consumer, to include, using Word2Vec, other terms that are also common to sites, including other sites the consumer has not yet visited, having the same personalities and/or topics to enrich an understanding of the consumer. These other sites are pulled in based on the overlapping characteristics of the consumer and the other sites to ensure that similar content is being used to enrich the understanding of the consumer.

In one embodiment, rather than expanding understanding of consumers on a consumer-by-consumer basis, the content manager groups together consumers that have similar characteristics, interests, and/or personalities. In one example, the consumers may be indistinguishable from each other due to common interests but for their unique identities. In another example, the consumers clustered together have similar personalities and similar interests in topics, but those personalities and interests in topics have been determined from different sources of user activity, such as different sites visited, different goods or services purchased, and/or different content engaged with.

The consumer profiles in the identity graph may have connections based on explicitly labeled or "supervised" data that resulted from activity directly tying a consumer to a site, topic, or personality, and other connections based on probabilistic relationships between the consumer and sites, topics, or personalities that have been inferred based on explicitly labeled data. The probabilistic relationships may be represented as edges in the identity graph, with a weight of the edge corresponding to a probability that the site, topic, or personality applies to the consumer.

In one embodiment, certain personalities or consumer categories are unlikely to co-occur with each other. For example, an "adventurous" personality may be negatively correlated with a "cautious" personality. If, in the identity graph, a consumer has been associated with a personality that is unlikely to co-occur with another personality, a weight of an edge between the consumer and the other personality may be decreased due to a weight of an edge between the consumer and the personality being increased. That said, even for rare co-occurrences, co-occurrences may still exist. There may be consumers who are cautious in one aspect of life, content consumption, and/or purchasing decisions, while being adventurous in another aspect of life, content consumption, and/or purchasing decisions. In these scenarios, the occurrence of the personality type may be tied to a particular topic in the identity graph. For example, the consumer node may have a connection with a cautious personality type for topics associated with food, represented by a weighted edge to a "personality: cautious; topic: food" node, and the consumer may have another connection with an adventurous personality type for topics associated with camping, represented by a weighted edge to a "personality: adventurous; topic: camping" node. The identity graph may include any number of combinations of personalities, topics, sentiments, etc., that have been detected to be co-occurring in groups of consumers, and the nodes representing the combinations may have strengths specific to the group and/or specific to individual consumers based on activity detected for the consumers as a whole or individually.

Once a graph has been generated to encode contents of pages, the graph may be used to identify URLs or content sources that attract candidate consumers with certain interests in topics (e.g., from an Interactive Advertising Bureau (IAB) taxonomy or graph), consumer types, sentiments (e.g., from a sentiment taxonomy or graph), brand safety, carbon emissions, disinformation content, and/or personalities. Whether or not secondary content is being placed on a site, a brand owner may wish to investigate the site and the owner of the site to determine topics, consumer types, sentiments, brand safety, carbon emissions, disinformation content, and/or personalities covered by the site. Such an investigation may be useful for exploring a partnership with an owner of the site, for example, and the investigation may be supported in a user interface that provides access to the graph to determine the categories for the sites owned by the owner.

Other Applications of Consumer Metric Categories

In one embodiment, the audience segments may be used to reach out to the candidate audiences with communication campaigns. In one embodiment, a user may visit a site that has been categorized based on contents of the site. For example, the user may be previously unknown to the content management system. The content management system may infer characteristics of the user on an identity graph based on the user's visit to the site that was categorized with the characteristics. For example, a user visiting a site may be determined to be associated with a particular category, and a communication campaign that communicates with a plurality of users in the particular category may send communication(s) to the user based on the new information that the user is associated with the particular category.

In one example, consumer metrics may be inferred not just for the site but for the consumer viewing the site. The consumer metrics may be attached to the user profile in an identity graph with a confidence level based on how strongly the site is associated with the consumer metrics. A communication campaign may be created to reach out to users having a particular set of consumer metrics (e.g., females aged 30-39) associated with them beyond a certain threshold strength. For example, users who visited sites strongly associated with this demographic would have high strengths of association with this demographic category, and users who visited sites weakly associated with this demographic would have low strengths of association with this demographic category.

In another example, an identity graph with updated consumer information may be updated and sold to candidate consumers to merge with other identity graphs and enrich other communication and customer support campaigns that utilize information from multiple identity graphs. The information may be sold in a manner that summarizes individual user information rather than providing individual user PII, and/or that includes individual user PII to the extent that such PII has been specifically cleared for inclusion by the involved individual users.

In various embodiments, information about what content has been successfully delivered to, interacted with or engaged with, or used to trigger a purchase or conversion, or otherwise positively consumed by consumers is used to infer personality characteristics and consumer metrics for individual consumers that positively consumed the content. The personality characteristics for the content in the graph may be used to add personality characteristics to the consumer in the graph, strengthening the tie between the consumer and the personality due to the positive interaction. The additional observations are due to the consumer's interaction with particular sites in particular categories. If there is no specific consumer identity known, characteristics of an anonymous consumer may be enriched. If the identity of the consumer is learned from the interactions with the sites, categories for the sites may be tied to the individual consumer in the graph.

The content manager may use the identity graph to find lookalike consumers for content delivery targeting, where the lookalike consumers have similar characteristics to consumers who have recently consumed content (even if the lookalike consumers have not recently consumed content), and/or to find other consumers who in a same cluster of consumers as the consumers who have recently consumed content or are likely to consume content for gaining a deeper understanding of characteristics that may be shared by the recent consumers.

Based on the adjustments to individuals of a group, other candidate consumers of the group may also be adjusted based on their membership to the group. In other words, if a group shifts in personality based on observed shifts from individual users in the group, other individual users of the group may also be adjusted to shift in personality to a lesser degree.

In one embodiment, a group, cluster, or candidate audience of candidate consumers may be grouped or clustered based on shared or similar characteristics. A group of candidate consumers that is grouped based on a set of characteristics other than personality may be determined to also comprise consumers that have the personality. If the personality is detected more than other personalities in content consumed by the group of consumers, the group may be labeled with the personality as well as the consumer metrics or other shared or similar characteristics. In this manner, the group may be used for content delivery targeting based on the personality.

In another embodiment, candidate consumers that were not previously grouped are detected as showing an interest in consuming content associated with a category or personality, and, as a result, the candidate consumers are grouped together in a group to be used for content delivery targeting based on the category or personality.

In one embodiment, candidate consumers who have been included in a group of candidate consumers having a personality or relating to a category may be removed from the group if the candidate consumers do not exhibit behavior similar to other candidate consumers in the group. For example, if the group includes candidate consumers who frequently visit pages marked with a personality, and a particular candidate consumer does not frequently visit pages marked with the personality and/or instead visits pages marked with other personalit(ies), the particular candidate consumer may be removed from the group as unlikely to exhibit the personality or behave consistently with the personality.

In various embodiments, the addition to or removal of candidate consumers from a group causes the candidate consumers to be included in or excluded from content delivery campaigns. The content delivery campaign may be defined based on contextual personality labels, and membership of candidate consumers to a group associated with the contextual personality labels may change over time based on updates to the groups. The campaigns may cause delivery to candidate consumers who are currently part of the group without causing delivery to candidate consumers who have been removed from the group.

In one embodiment, audiences updated with consumer metrics or personality information based on the content delivery context may be used to adjust content outreach strategies, adjust content generated, and/or adjust products or services offered. A user interface may display, to a user, information that a brand is associated with an audience of candidate consumers or actual past consumers that have newly been associated with a personality context. The personality context may be provided to update strategies to ensure the consumers expectations are met with content delivered.

In one embodiment, candidate consumers are associated with activities or engagement that is known to be associated with a certain category or personality type. For example, candidate consumers making purchases to take trips to exotic or dangerous locations may be known to be adventurous by their evidenced activity. As another example, candidate consumers who have characteristics or consumer metrics in common (e.g., having active frequent flyer accounts, owning certain vehicles, etc.) with other adventurous people may be clustered with adventurous people based on the common characteristics or consumer metrics. In yet another embodiment, candidate consumers may have responded to content delivery campaigns where the candidate consumers were directly contacted, and such responses may indicate an interest in certain topics covered by the campaigns. In this manner, a size of a group of candidate consumers marked as having a certain personality may grow independently of pages visited or content consumed by the candidate consumers.

In one embodiment, the changing group of candidate consumers known to be associated with a category or personality may be used to update which content sources are associated with the category or personality. For example, if the changing group frequently visits a page that is not on a list of content sources associated with the category or personality, the page may be added to the list. As another example, if the changing group infrequently or never visits a page that is on the list, for example, even after being given opportunities to visit the page, the page may be removed from the list.

A graph that associates sites to personalities, topics, and other categories may be updated based on a graph that associates candidate consumers to personalities, topics, and other categories. For example, if a set of candidate consumers show a strong tendency or high likelihood of consuming content in a particular personality, topic, or other category, or a combination thereof, and the set of candidate consumers also show a strong tendency or high likelihood of consuming content from a specific site, the specific site may be labeled with the particular personality, topic, or other category. Alternatively, a strength of a tie or weight between the specific site and the particular personality, topic, or other category may be increased based on the candidate consumer association.

The candidate consumer information may be used to generate or update the information about primary content, or vice versa. The candidate consumer information from the graph may exist first, and groups of consumers known to have certain personalities may be analyzed to determine top sites visited by the groups of consumers. Those sites may be used as seeds to generate keywords and categories for primary content. Alternatively, the site mappings may exist first based on seeds that are used to generate keywords, and the sites known to appeal to certain personalities may be analyzed to determine which consumers are visiting the sites. Inferences may be made that those consumers are interested in the topics, personalities, or other categories covered by the sites to build or update the consumer graph.

The graph may also be used to combine topics, personalities, consumer types, and other characteristics to find content source(s) that attract candidate consumers, which may be unknown at the individual level, with combinations of interests in topics, consumer types, sentiments, and/or personalities. A content manager accessing the graph may select the content source(s) that have a highest probability of being associated with the combination of characteristics provided, to maximize engagement with an audience that may otherwise be unknown. Secondary content may be delivered on the selected content source(s) to candidate audience members of those selected content source(s) without a need to contact the candidate audience members using personalized or individualized information, verifiable consumer metrics, or any other personally identifiable information (PII).

In various embodiments, content may be generated based on the determined category and generated consumer metrics. The content generator may generate content that is more tailored to and optimized for content consumers with the predicted consumer metrics, to maximize engagement. In one embodiment, the content generator may be a user viewing a user interface that provides the determined category or generated consumer metrics, and the user may tailor the content based on the information provided on the user interface. In another embodiment, the content generator is a machine that selects existing content, assembles a combination of existing content, assembles a combination of existing and new content, and/or generates new content based on the determined category and the generated consumer metrics.

In one embodiment, a prompt is generated for a large language model based on the determined category and the generated consumer metrics. The prompt may request textual, image, and/or video content that will cause positive engagement with a user matching the generated consumer metrics, and/or incorporating certain images, such as brand images or images of goods or services, in the result. Large language models such those from Cohere and/or OpenAI may be used to generate results for the prompt, and a user may review the results before sending to the candidate audience. In one embodiment, the results from the large language model are incorporated into a content delivery campaign for the candidate audience and sent to the audience automatically without user intervention between predicting the consumer metrics and delivering content to the candidate audience.

In one embodiment, the prompt to the large language model or a guide on the user interface for a content drafting user may include keywords known to be associated with the determined categories or predicted consumer metrics, such as keywords from the Word2Vec model of the categories. The keywords may be included as suggested terms or concepts to included in targeted content, and the targeted content may be prompted to offer or sell certain goods or services or include a tag line to interest candidate consumers in engaging with content to offer or sell certain goods or services.

In one embodiment, as a result of the prompt, the large language model automatically generates a text template to be included in a corpus of content for delivery in association with a topic, personality, or other category. The text template may be customized and personalized for individual candidate consumers, for example, by replacing name placeholders with actual names of the candidate consumers as determined from a candidate consumer profile in a candidate consumer graph. The text template may also be customized and personalized further based on individual interests or preferences of the candidate consumer, which may also be determined from the consumer profile in the candidate consumer graph. The customized text may be included as part of content delivered to the candidate consumer, for example, in a direct communication campaign.

Computer System Architecture

Figure 5:
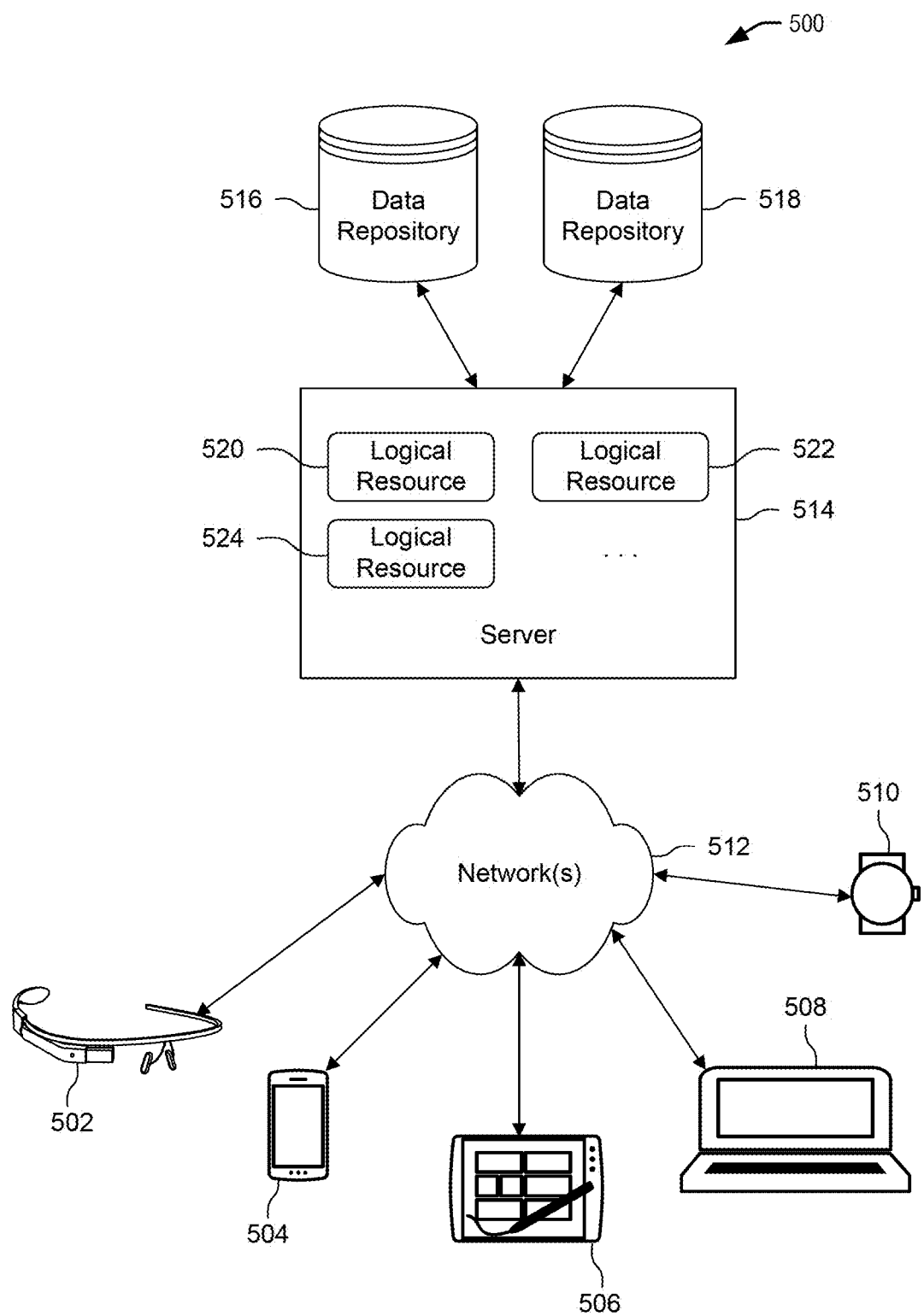
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for content management.

In certain aspects, server 514 may also provide other services or software applications that can include non-virtual and virtual environments. In some aspects, these services may be offered as web-based or cloud services, such as under a Software as a Service (SaaS) model to the users of client computing devices 502, 504, 506, 508, and/or 510. Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for content management in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy®

Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for content management. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
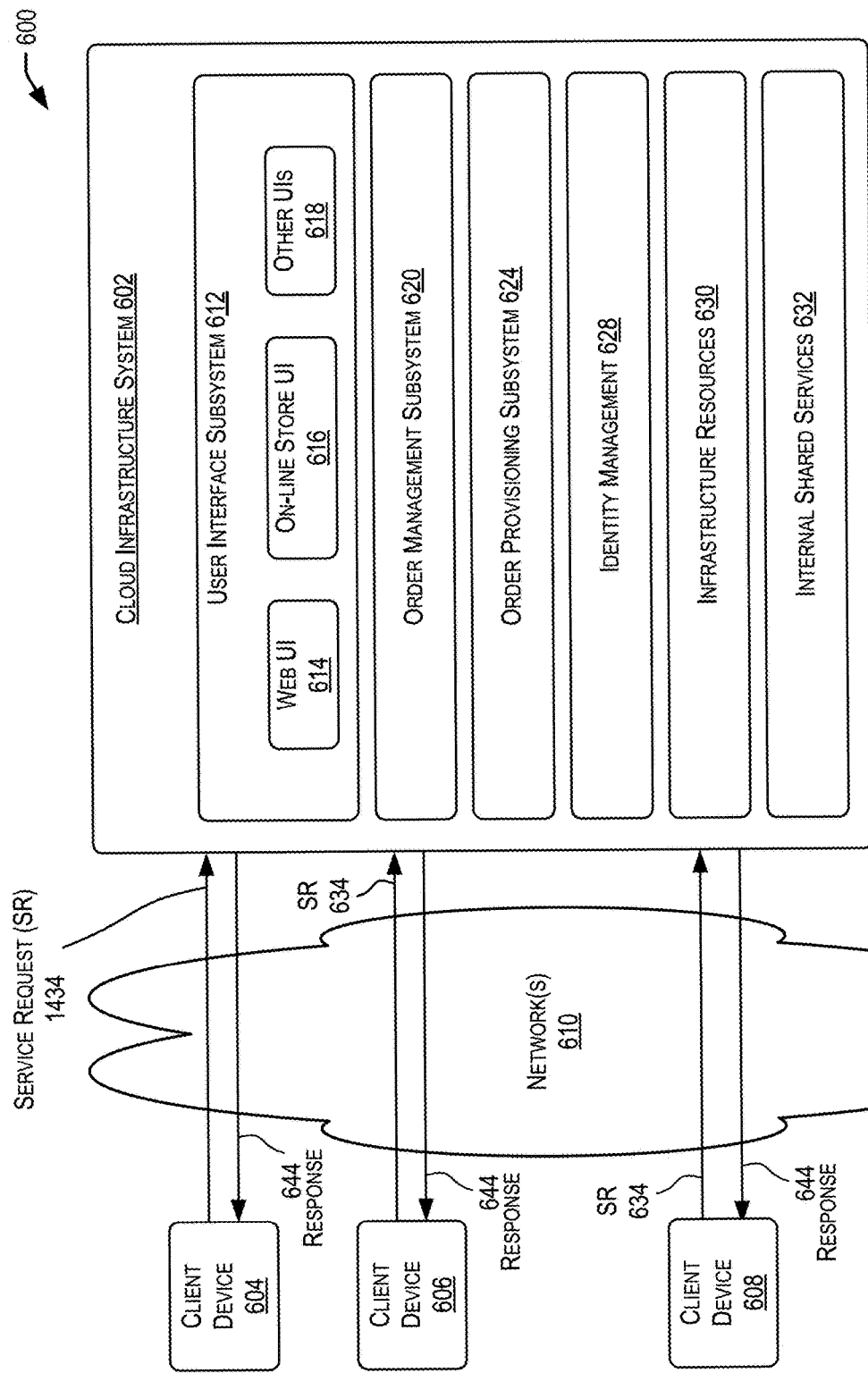
FIG. 6 is a simplified block diagram of one or more components of a system environment by which services provided by one or more components of an embodiment system may be offered as cloud services, in accordance with certain aspects.

In certain aspects, the techniques for content management. FIG. 6 is a simplified block diagram of a cloud-based system environment in which content management, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 514. The computers in cloud infrastructure system 602 may be organized as general-purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other aspects, cloud infrastructure system 602 may have more or fewer components than those depicted in FIG. 6, may combine two or more components, or may have a different configuration or arrangement of components. For example, although FIG.

6 depicts three client computing devices, any number of client computing devices may be supported in alternative aspects.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 602. Cloud infrastructure system 602 then performs processing to provide the services requested in the tenant's subscription order. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public tenant, where the tenant can be an individual or an enterprise. In certain other aspects, under a private cloud model, cloud infrastructure system 602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 602 and the services provided may be shared by several organizations in a related community. Various other models such as hybrids of the above-mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602.

In some aspects, the processing performed by cloud infrastructure system 602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain aspects, to facilitate efficient provisioning of these resources for supporting the various cloud services provided by cloud infrastructure system 602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a tenant may, using a client device, request (service request 634) one or more services provided by cloud infrastructure system 602 using one or more of interfaces 614, 616, and 618. For example, a tenant may access the online store, browse cloud services offered by cloud infrastructure system 602, and place a subscription order for one or more services offered by cloud infrastructure system 602 that the tenant wishes to subscribe to. The service request may include information identifying the tenant and one or more services that the tenant desires to subscribe to.

In certain aspects, such as the embodiment depicted in FIG. 6, cloud infrastructure system 602 may comprise an order management subsystem (OMS) 620 that is configured to process the new order. As part of this processing, OMS 620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 602 may send a response or notification 644 to the requesting tenant to indicate when the requested service is now ready for use. In some instances, information (e.g., a link) may be sent to the tenant that enables the tenant to start using and availing the benefits of the requested services.

Cloud infrastructure system 602 may provide services to multiple tenants. For each tenant, cloud infrastructure system 602 is responsible for managing information related to one or more subscription orders received from the tenant, maintaining tenant data related to the orders, and providing the requested services to the tenant or clients of the tenant. Cloud infrastructure system 602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 602 may provide services to multiple tenants in parallel. Cloud infrastructure system 602 may store information for these tenants, including possibly proprietary information. In certain aspects, cloud infrastructure system 602 comprises an identity management subsystem (IMS) 628 that is configured to manage tenant's information and provide the separation of the managed information such that information related to one tenant is not accessible by another tenant. IMS 628 may be configured to provide various security-related services such as identity services, such as information access management, authentication and authorization services, services for managing tenant identities and roles and related capabilities, and the like.

Figure 7:
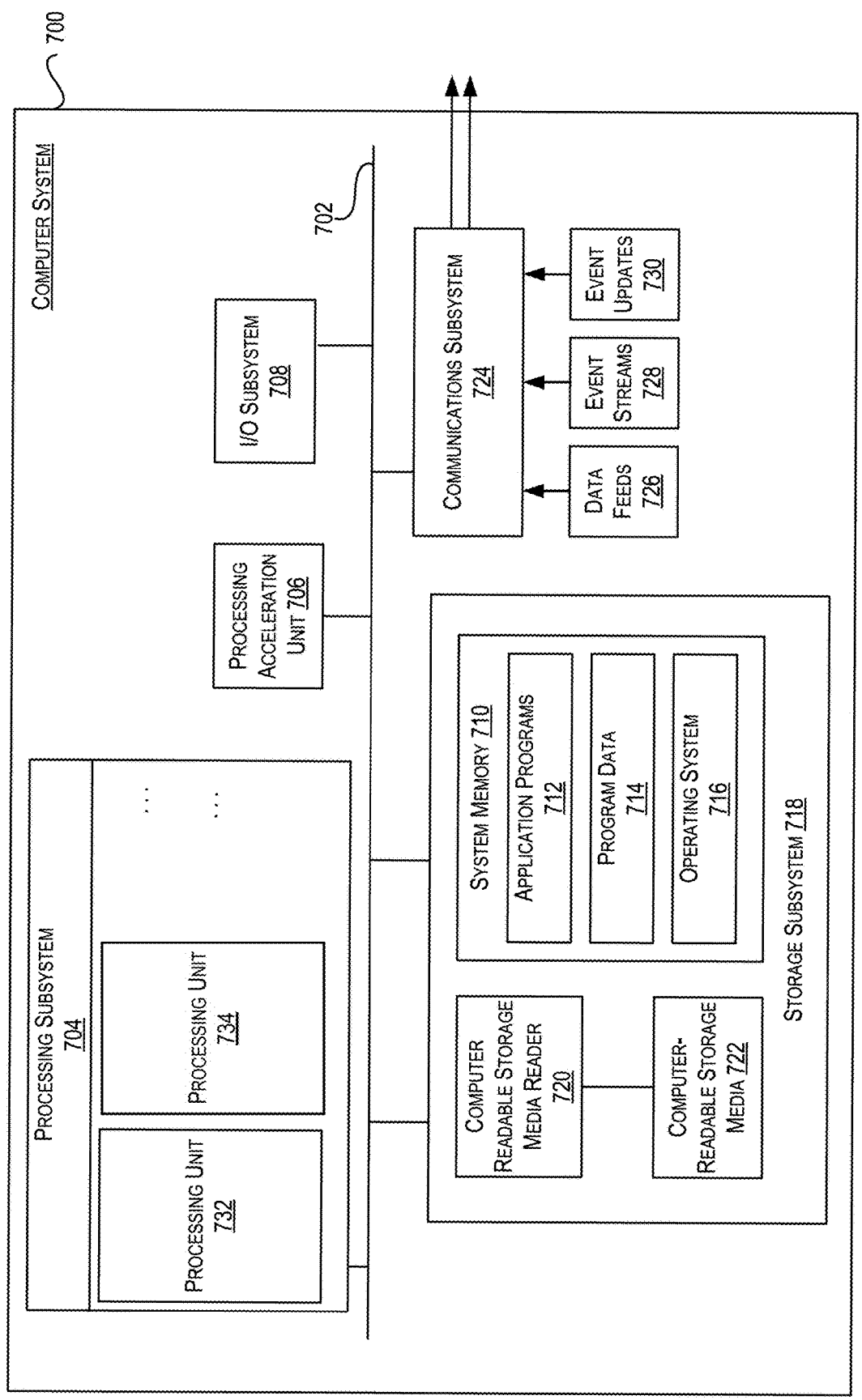
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
receiving a first invocation of a script from a particular site, wherein the first invocation of the script invokes an API to provide secondary content within a content delivery window;
in response to the first invocation of the script, retrieving particular content from the particular site in an automated session with the particular site, wherein the particular content comprises image content;
generating, in response to the first invocation of the script, one or more first vector embeddings of the particular content based at least in part on a textual description of the image content automatically generated by an image recognition machine learning model;
categorizing the particular content in a first category based at least in part on:
a first similarity between the one or more first vector embeddings and one or more first aggregate vector embeddings of one or more first sites in the first category, and
a second similarity between the one or more first vector embeddings and one or more second aggregate vector embeddings of one or more second sites in a second category; wherein a plurality of categories comprise the first category and the second category, and wherein a plurality of sites comprise the one or more first sites and the one or more second sites;
accessing:
one or more first values of one or more consumer metrics for a first subset of instances of content consumption by content consumers opted in for consumer metric collection for one or more sites in one or more categories, and
one or more second values of the one or more consumer metrics for a second subset of instances of content consumption by content consumers opted in for consumer metric collection for one or more sites in the one or more categories;
wherein the one or more consumer metrics about the first subset of instances of content consumption vary among at least two different content consumers even for a same site; and
wherein the one or more consumer metrics about the second subset of instances of content consumption vary among at least two different content consumers even for a same site;
generating, in response to the first invocation of the script, one or more second vector embeddings for first content from one or more sites of the plurality of sites consumed in the first subset of instances and one or more third vector embeddings for second content from one or more sites of the plurality of sites consumed from the second subset of instances;
based at least in part on the one or more second vector embeddings and the one or more first values of the one or more consumer metrics for the first subset of instances of content consumption, and in response to the first invocation of the script, training a machine learning model to predict one or more values of the one or more consumer metrics given a vector embedding of a site;
validating, in response to the first invocation of the script, the machine learning model against the one or more third vector embeddings and the one or more second values of the one or more consumer metrics for the second subset of instances of content consumption;
applying, in response to the first invocation of the script, the machine learning model as validated to predict one or more values of one or more consumer metrics for at least a third subset of instances of content consumption for the particular content in the first category;
delivering secondary content in response to the first invocation of the script, within the content delivery window and based on initial information of the particular site not determined from the categorizing the particular content in the first category, wherein the delivering the secondary content in response to the first invocation of the script is performed in parallel to the retrieving the particular content from the particular site;
for the third subset of instances of content consumption by a particular consumer, receiving a second invocation of the script from the particular site;
generating other secondary content to be delivered at least in part by:
generating a prompt to a large language model, wherein the prompt requests content based at least in part on the first category as determined from the categorizing the particular content in the first category;

receiving content targeted to the first category; and embedding, in other secondary content to be delivered including the content targeted to the first category, a unique tracking identifier that identifies the particular consumer of the particular site for the third subset of instances of content consumption;

in response to the second invocation, delivering the other secondary content within the content delivery window; and matching the unique tracking identifier to the particular consumer by comparing the unique tracking identifier to an identity graph that stores information about content consumption activity.

2. The computer-implemented method of claim 1, wherein the retrieving the particular content from the particular site is in response to a request to view the site by a user and wherein method further comprises:

sending a third content to the user at least in part based on the first category and the one or more values of the one or more consumer metrics for at least the third subset of instances of content consumption.

3. The computer-implemented method of claim 1, wherein the accessing one or more first values and the accessing one or more second values occur before the retrieving the particular content.

4. The computer-implemented method of claim 1, wherein applying the machine learning model as validated includes:

inputting the first category and the one or more first vector embeddings of the particular content to the machine learning model.

5. The computer-implemented method of claim 1, wherein applying the machine learning model as validated includes:

based at least in part on the first category, selecting the machine learning model from a plurality of available machine learning models, wherein each machine learning model of the plurality of available machine learning models is trained for one or more categories of the plurality of categories; and inputting the one or more first vector embeddings of the particular content to the machine learning model.

6. The computer-implemented method of claim 1, wherein the computer-implemented method further comprises:

applying the machine learning model as validated to predict a second one or more values of a second one or more consumer metrics for at least a fourth instance of content consumption for third content in a third category.

7. The computer-implemented method of claim 1, the computer-implemented method further comprising:

receiving one or more verified values of the one or more consumer metrics for at least the third subset of instances of content consumption for the particular content; and verifying the predicted one or more values of the one or more consumer metrics for at least the third subset of instances of content consumption for the particular content.

8. The computer-implemented method of claim 1, wherein the one or more consumer metrics comprise groupings of demographic information for multiple users.

9. The computer-implemented method of claim 1, wherein the one or more third vector embeddings comprise an aggregate vector embedding that is determined from a plurality of vector embeddings for the second content.

10. The computer-implemented method of claim 1, wherein the particular content comprises at least one image, and wherein the one or more first vector embeddings are determined based at least in part on characteristics detected based on similarities to one or more entries in a dictionary of patterns in the at least one image;

wherein the first content from the one or more sites of the plurality of sites consumed in the first subset of instances comprises images, and wherein the one or more second vector embeddings are determined based at least in part on characteristics detected based on similarities to one or more entries in a dictionary of patterns in the images.

11. A computer-program product comprising one or more non-transitory machine-readable storage media, including stored instructions configured to cause a computing system to perform a set of actions including:

receiving a first invocation of a script from a particular site, wherein the first invocation of the script invokes an API to provide secondary content within a content delivery window;

in response to the first invocation of the script, retrieving particular content from the particular site in an automated session with the particular site, wherein the particular content comprises image content;

generating, in response to the first invocation of the script, one or more first vector embeddings of the particular content based at least in part on a textual description of the image content automatically generated by an image recognition machine learning model;

categorizing the particular content in a first category based at least in part on:

a first similarity between the one or more first vector embeddings and one or more first aggregate vector embeddings of one or more first sites in the first category, and a second similarity between the one or more first vector embeddings and one or more second aggregate vector embeddings of one or more second sites in a second category; wherein a plurality of categories comprise the first category and the second category, and wherein a plurality of sites comprise the one or more first sites and the one or more second sites;

accessing:

one or more first values of one or more consumer metrics for a first subset of instances of content consumption by content consumers opted in for consumer metric collection for one or more sites in one or more categories, and one or more second values of the one or more consumer metrics for a second subset of instances of content consumption by content consumers opted in for consumer metric collection for one or more sites in the one or more categories;

wherein the one or more consumer metrics about the first subset of instances of content consumption vary among at least two different content consumers even for a same site; and wherein the one or more consumer metrics about the second subset of instances of content consumption vary among at least two different content consumers even for a same site;

generating, in response to the first invocation of the script, one or more second vector embeddings for first content from one or more sites of the plurality of sites consumed in the first subset of instances and one or more third vector embeddings for second content from one or more sites of the plurality of sites consumed from the second subset of instances;

based at least in part on the one or more second vector embeddings and the one or more first values of the one or more consumer metrics for the first subset of instances of content consumption, and in response to the first invocation of the script, training a machine learning model to predict one or more values of the one or more consumer metrics given a vector embedding of a site;

validating, in response to the first invocation of the script, the machine learning model against the one or more third vector embeddings and the one or more second values of the one or more consumer metrics for the second subset of instances of content consumption;

applying, in response to the first invocation of the script, the machine learning model as validated to predict one or more values of one or more consumer metrics for at least a third subset of instances of content consumption for the particular content in the first category;

delivering secondary content in response to the first invocation of the script, within the content delivery window and based on initial information of the particular site not determined from the categorizing the particular content in the first category, wherein the delivering the secondary content in response to the first invocation of the script is performed in parallel to the retrieving the particular content from the particular site;

for the third subset of instances of content consumption by a particular consumer, receiving a second invocation of the script from the particular site;

generating other secondary content to be delivered at least in part by:
  generating a prompt to a large language model, wherein the prompt requests content based at least in part on the first category as determined from the categorizing the particular content in the first category;
  receiving content targeted to the first category; and
  embedding, in other secondary content to be delivered including the content targeted to the first category, a unique tracking identifier that identifies the particular consumer of the particular site for the third subset of instances of content consumption;

in response to the second invocation, delivering the other secondary content within the content delivery window; and matching the unique tracking identifier to the particular consumer by comparing the unique tracking identifier to an identity graph that stores information about content consumption activity.

12. The computer-program product of claim 11, wherein the retrieving the particular content from the particular site is in response to a request to view the site by a user and wherein the set of actions further includes:
  sending a third content to the user at least in part based on the first category and the one or more values of the one or more consumer metrics for at least the third subset of instances of content consumption.

13. The computer-program product of claim 11, wherein applying the machine learning model as validated includes:
  based at least in part on the first category, selecting the machine learning model from a plurality of available machine learning models, wherein each machine learning model of the plurality of available machine learning models is trained for one or more categories of the plurality of categories; and
  inputting the one or more first vector embeddings of the particular content to the machine learning model.

14. The computer-program product of claim 11, wherein the set of actions further includes:
  applying the machine learning model as validated to predict a second one or more values of a second one or more consumer metrics for at least a fourth instance of content consumption for third content in a third category.

15. The computer-program product of claim 11, wherein the set of actions further includes:
  receiving one or more verified values of the one or more consumer metrics for at least the third subset of instances of content consumption for the particular content; and
  verifying the predicted one or more values of the one or more consumer metrics for at least the third subset of instances of content consumption for the particular content.

16. A system comprising:
  one or more processors;
  one or more non-transitory computer-readable media storing instructions, which, when executed by the system, cause the system to perform a set of actions including:
    receiving a first invocation of a script from a particular site, wherein the first invocation of the script invokes an API to provide secondary content within a content delivery window;
    in response to the first invocation of the script, retrieving particular content from the particular site in an automated session with the particular site, wherein the particular content comprises image content;
    generating, in response to the first invocation of the script, one or more first vector embeddings of the particular content based at least in part on a textual description of the image content automatically generated by an image recognition machine learning model;
    categorizing the particular content in a first category based at least in part on:
      a first similarity between the one or more first vector embeddings and one or more first aggregate vector embeddings of one or more first sites in the first category, and
      a second similarity between the one or more first vector embeddings and one or more second aggregate vector embeddings of one or more second sites in a second category; wherein a plurality of categories comprise the first category and the second category, and wherein a plurality of sites comprise the one or more first sites and the one or more second sites;
    accessing:
      one or more first values of one or more consumer metrics for a first subset of instances of content consumption by content consumers opted in for consumer metric collection for one or more sites in one or more categories, and
      one or more second values of the one or more consumer metrics for a second subset of instances of content consumption by content consumers opted in for consumer metric collection for one or more sites in the one or more categories;
      wherein the one or more consumer metrics about the first subset of instances of content consumption vary among at least two different content consumers even for a same site; and wherein the one or more consumer metrics about the second subset of instances of content consumption vary among at least two different content consumers even for a same site;

generating, in response to the first invocation of the script, one or more second vector embeddings for first content from one or more sites of the plurality of sites consumed in the first subset of instances and one or more third vector embeddings for second content from one or more sites of the plurality of sites consumed from the second subset of instances;

based at least in part on the one or more second vector embeddings and the one or more first values of the one or more consumer metrics for the first subset of instances of content consumption, and in response to the first invocation of the script, training a machine learning model to predict one or more values of the one or more consumer metrics given a vector embedding of a site;

validating, in response to the first invocation of the script, the machine learning model against the one or more third vector embeddings and the one or more second values of the one or more consumer metrics for the second subset of instances of content consumption;

applying, in response to the first invocation of the script, the machine learning model as validated to predict one or more values of one or more consumer metrics for at least a third subset of instances of content consumption for the particular content in the first category;

delivering secondary content in response to the first invocation of the script, within the content delivery window and based on initial information of the particular site not determined from the categorizing the particular content in the first category, wherein the delivering the secondary content in response to the first invocation of the script is performed in parallel to the retrieving the particular content from the particular site;

for the third subset of instances of content consumption by a particular consumer, receiving a second invocation of the script from the particular site;

generating other secondary content to be delivered at least in part by:
  generating a prompt to a large language model, wherein the prompt requests content based at least in part on the first category as determined from the categorizing the particular content in the first category;
  receiving content targeted to the first category; and
  embedding, in other secondary content to be delivered including the content targeted to the first category, a unique tracking identifier that identifies the particular consumer of the particular site for the third subset of instances of content consumption;

in response to the second invocation, delivering the other secondary content within the content delivery window; and matching the unique tracking identifier to the particular consumer by comparing the unique tracking identifier to an identity graph that stores information about content consumption activity.

17. The system of claim 16, wherein the retrieving the particular content from the particular site is in response to a request to view the site by a user and wherein the set of actions further includes:
  sending a third content to the user at least in part based on the first category and the one or more values of the one or more consumer metrics for at least the third subset of instances of content consumption.

18. The system of claim 16, wherein applying the machine learning model as validated includes:
  inputting the first category and the one or more first vector embeddings of the particular content to the machine learning model.

19. The system of claim 16, wherein applying the machine learning model as validated includes:
  based at least in part on the first category, selecting the machine learning model from a plurality of available machine learning models, wherein each machine learning model of the plurality of available machine learning models is trained for one or more categories of the plurality of categories; and
  inputting the one or more first vector embeddings of the particular content to the machine learning model.

20. The system of claim 16, wherein the set of actions further includes:
  applying the machine learning model as validated to predict a second one or more values of a second one or more consumer metrics for at least a fourth instance of content consumption for third content in a third category.

* * * * *